(12) United States Patent
Rodewald (10) Patent No.: US 10,779,475 B2
(45) Date of Patent: Sep. 22, 2020

(54) BALE FORMING APPARATUS AND METHOD WITH A FREE-WHEEL CLUTCH

(71) Applicant: Forage Company B.V., Maassluis (NL)

(72) Inventor: Peter Rodewald, Denkte-Neindorf (DE)

(73) Assignee: Forage Company B.V., Maassluis (NL)

( * ) Notice: Subject to any disclaimer, the term of this patent is extended or adjusted under 35 U.S.C. 154(b) by 324 days.

(21) Appl. No.: 15/906,814

(22) Filed: Feb. 27, 2018

(65) Prior Publication Data

US 2018/0242528 A1 Aug. 30, 2018

(30) Foreign Application Priority Data

Feb. 28, 2017 (NL) ...................................... 2018436

(51) Int. Cl.
| | |
|---|---|
| *A01F 15/08* | (2006.01) |
| *A01F 15/07* | (2006.01) |
| *A01F 15/10* | (2006.01) |
| *B60W 10/02* | (2006.01) |
| *B30B 9/30* | (2006.01) |
| *A01D 75/18* | (2006.01) |

(52) U.S. Cl.
CPC ........ *A01F 15/085* (2013.01); *A01F 15/0715* (2013.01); *A01F 15/0765* (2013.01); *A01F 15/0833* (2013.01); *A01F 15/0841* (2013.01); *A01F 15/106* (2013.01); *B30B 9/3082* (2013.01); *B60W 10/02* (2013.01); *A01D 75/182* (2013.01); *A01F 2015/077* (2013.01); *B30B 9/305* (2013.01)

(58) Field of Classification Search
CPC ................ A01F 15/085; A01F 15/0715; A01F 15/0833; A01F 15/0765; A01F 15/0841; A01F 15/106; A01F 2015/077; B30B 9/3082; B30B 9/305; B60W 10/02; A01D 75/182
USPC ................................ 100/179, 87, 88; 53/582
See application file for complete search history.

(56) References Cited

U.S. PATENT DOCUMENTS

| | | | |
|---|---|---|---|
| 4,553,885 A | 11/1985 | Koevari et al. | |
| 5,129,207 A * | 7/1992 | Butler | ................. A01F 15/0715 53/118 |

(Continued)

FOREIGN PATENT DOCUMENTS

| | | |
|---|---|---|
| DE | 92 06 232 U1 | 7/1992 |
| DE | 43 29 469 A1 | 3/1995 |

(Continued)

OTHER PUBLICATIONS

European Patent Office, International Search Report prepared for Priority Application No. NL 2018436, dated Oct. 30, 2017.

*Primary Examiner* — Jimmy T Nguyen (57) ABSTRACT

A bale forming apparatus including a bale forming device providing a bale forming chamber, a rotatable driving member, a shaft, and a free-wheel clutch provided between the shaft and the rotatable driving member. The shaft drives at least temporarily the rotatable driving member. The free-wheel clutch transfers a rotation of the shaft onto the driving member. The rotated driving member drives at least one part of the bale forming device. The bale forming device forms a bale in the provided bale forming chamber. At least one time the rotatable driving member is rotated with respect to the shaft. The free-wheel clutch enables this rotation of the rotatable driving member.

21 Claims, 7 Drawing Sheets

(56) References Cited

U.S. PATENT DOCUMENTS

| | | | |
|---|---|---|---|
| 6,928,792 B1* | 8/2005 | Viesselmann | A01F 15/0715 220/557 |
| 7,727,114 B2* | 6/2010 | Tarasinski | A01B 71/06 180/53.7 |
| 2003/0167939 A1* | 9/2003 | Roth | A01F 15/0841 100/342 |
| 2004/0187468 A1* | 9/2004 | Krone | A01F 15/0825 56/341 |
| 2010/0036569 A1* | 2/2010 | Hel | A01B 61/025 701/50 |
| 2015/0373917 A1* | 12/2015 | Reijersen Van Buuren | A01F 15/0715 53/399 |
| 2016/0235007 A1* | 8/2016 | Hoffmann | A01F 15/0833 |
| 2017/0118919 A1* | 5/2017 | Tenbult | A01F 15/0883 |

FOREIGN PATENT DOCUMENTS

| | | | | |
|---|---|---|---|---|
| EP | 0933018 A2 * | 8/1999 | | A01F 15/0841 |
| EP | 1205102 A2 | 5/2002 | | |
| EP | 1 466 520 A1 | 10/2004 | | |
| EP | 1 974 601 A1 | 10/2008 | | |

\* cited by examiner

BALE FORMING APPARATUS AND METHOD WITH A FREE-WHEEL CLUTCH

BACKGROUND

Field of the Invention

The invention refers to a bale forming apparatus and to a bale forming method for forming under pressure at least one bale from loose material, in particular a round-cylindrical bale from agricultural crop material.

Description of Related Art

A bale forming apparatus (baler) forms round-cylindrical or cuboid bales, is moved by an own motor or a pulling vehicle over an agricultural field, and presses picked-up or otherwise received crop material to bales. While being moved over ground and forming bales from picked up crop material, the load which is applied onto shafts and other rotating parts of the bale forming apparatus can vary over time and can rapidly take a high value, e.g. due to a clump of crop material. Several proposals how to protect the baler and the pulling vehicle have been made.

A bale forming apparatus as disclosed in US 20160235007 A1 comprises a bale forming device, a feeding device, an input shaft, a feeding-side output shaft, a forming-side output shaft, and a gearbox connecting the input shaft with both output shafts. The baler input shaft can be connected with the PTO shaft of a pulling tractor and is rotated by the PTO shaft. The input shaft rotates via the gearbox both output shafts. A clump of crop material or a rigid object in the flow of picked-up crop material can cause a rapidly increasing load onto the feeding device. To compensate the high load, torque is transferred from the bale forming device to the feeding device. Nevertheless the case may occur that an overload clutch in the input shaft is activated and disconnects the input shaft. Therefore the output shafts are no longer rotated.

SUMMARY OF THE INVENTION

The high load which the crop material or a rigid object applies onto the feeding device of US 20160235007 A1 causes the feeding device to cease rotation and to stop quickly. The inertia of the rotating or otherwise moving bale forming parts, however, tend to rotate the bale rotating parts and connecting elements while the forming-side output shaft is stopped. This relative movement may cause damage.

A problem solved by the invention is to reduce the risk that an abrupt interruption of rotating the shaft for the bale forming device causes damage to this shaft.

The bale forming apparatus according to the invention comprises
- a bale forming device,
- a rotatable driving member,
- a shaft, and
- a free-wheel clutch.

The bale forming device provides a bale forming chamber. The bale forming apparatus can receive loose material and can inject the received loose material into the provided bale forming chamber. The bale forming device can form in the provided bale forming chamber at least one bale from injected loose material.

The rotatable driving member is in drive connection with at least one rotatable part of the bale forming device. The shaft is at least temporarily in drive connection with the rotatable driving member. For forming a bale the shaft is rotated in a driving direction about a shaft rotating axis to rotate the driving member in a bale forming direction the or every rotatable part which is in drive connection with the driving member.

The free-wheel clutch is provided between the shaft and the rotatable driving member. The free-wheel clutch transfers a rotation of the shaft in a driving direction onto the driving member. This transferred rotation causes the rotatable driving member to rotate in a bale forming rotating direction. The free-wheel clutch enables a rotation of the rotatable driving member in the bale forming rotating direction with respect to the shaft.

Advantages

The free-wheel clutch transfers the rotation of the shaft onto the rotatable driving member and thereby onto at least one rotatable part of the bale forming device. As long as the shaft is rotated, the bale forming device operates as usual, i.e. the free-wheel clutch does not significantly affect the operation of the driving member and of the bale forming device. In general no significant rotational movement between the driving member and the shaft occurs.

It may happen, however, that the shaft decelerates or stops its rotation. A possible reason is that an overload clutch on board of the bale forming apparatus interrupts the main input shaft or a gearbox. It is further possible that the PTO shaft of the pulling tractor suddenly stops rotating the baler input shaft, e.g. as an overload clutch on board of the tractor is automatically activated or due to an intervention of the operator.

As soon as the shaft decelerates or stops its rotation, the free-wheel clutch automatically disconnects the shaft from the further rotating driving element and thereby from the bale forming device. The inertia of the rotatable bale forming part tends to rotate the driving member in the bale forming direction. The driving member can continue its rotation without rotating the shaft. Thanks to the free-wheel clutch the inertia of the still moving bale forming parts does not have an undesired impact on the shaft.

The free-wheel clutch according to the invention provides a security mechanism with purely passive mechanical parts. No input from a control unit is required. The clutch reacts immediately and without delay on the event that the shaft does not rotate.

PREFERRED EMBODIMENTS

In one embodiment of the free-wheel clutch a driver rotates a follower. The shaft is in drive connection with the driver and rotates the driver in the driving direction. The follower is in drive connection with the driving member is rotated in the bale forming direction. This rotation causes the rotatable driving member to rotate. The inertia of the rotatable bale forming part tends to rotate the follower in the bale forming direction. The follower can rotate with respect to the driver in the bale forming rotating direction. The driver and the follower belong to the free-wheel clutch and can be adapted to the forces and torques which are to be transmitted and to the rotational velocities.

In a preferred embodiment a driver-side serrated member can engage a follower-side serrated member. The driver-side serrated member is in drive connection with the shaft and the follower-side serrated member is in drive connection with the driving member. When the serrated members engage each other, several teeth of the serrated members engage each other such that the torque and the rotational force are distributed onto several elements. For temporarily disconnecting the driving member from the shaft. The engagement between the serrated members is temporarily interrupted. For this disengagement only limited space in a direction parallel to the rotating axis of the driving member is required. The shaft rotates the driver-side serrated member. If the follower-side serrated member is rotated, it rotates the driving member. As long as the driver-side serrated member engages the follower-side serrated member, the rotation of the driver-side serrated member is transferred onto the follower-side serrated member, preferably without substantial slippage or free rotation. If the driving member rotates with respect to the shaft in the bale forming direction, the teeth prevent a relative rotation over a large angle and further prevent a jerk which may occur in an alternative implementation of the free-wheel clutch.

The, or every, driver-side serrated member can belong to the driver mentioned above. The, or every, follower-side serrated member can belong to the follower.

In one implementation the follower-side serrated member is rigidly mounted on the driving member. In one implementation the driver-side serrated member is rigidly connected with the shaft.

Preferably the free-wheel clutch comprises a hub which is mounted on the shaft. The driver-side serrated member is rigidly connected with this hub. Thanks to the hub the driver-side serrated member cannot move radially with respect to the shaft but can—if at all—only move axially, in particular at least when manufacturing the bale forming apparatus.

In a preferred implementation at least one of the driver-side serrated member or the follower-side serrated member is implemented as a crown gear or spur gear. Preferably the or every crown gear has a closed sequence of teeth wherein every tooth has a front face which extends in a plane perpendicular to the rotating axis of the driving member and an angular rear face. Preferably the teeth are arranged in a toroidal sequence. This implementation with crown gears provides a very robust construction.

In a preferred embodiment a follower-side biasing member tends to bias the follower towards the driver, preferably in a direction parallel to the rotating axis of the driving member. A rotation of the driving member with respect to the shaft in the bale forming rotating direction is possible and causes the follower to be moved away from the driver against the force of the biasing member. If the driver and the follower are implemented as serrated members, the teeth are moved away from each other against the biasing force. This movement temporarily disconnects the follower from the driver. As soon as the driving member stops its rotation, the follower-side biasing member again establishes the drive connection between the driver and the follower.

This embodiment enables a rigid implementation of the biasing member. For establishing the drive connection between the driver and the follower the biasing member only needs to move the follower over a short distance towards the driver. A movement in the opposite direction over this short distance disconnects the follower from the driver. The torque applied by the driver onto the follower occurs in a direction perpendicular to the working direction of the biasing member and can therefore not cause damage to the biasing member.

In one implementation the follower-side biasing member tends to bias the follower and/or the follower-side serrated member towards the driver and/or towards the driver-side serrated member. In one implementation the follower-side biasing member can move the entire driving member together with the follower and/or the follower-side serrated member towards the shaft.

In one implementation the follower-side biasing member rotates together with the follower and preferably also together with the driving member. This implementation further reduces the risk of damage. It is also possible that the follower-side biasing member rotates together with the driver and/or together with the shaft. The biasing member can simply be implemented as a helical pressing or pulling spring.

In an alternative embodiment a driver-side biasing member tends to bias the driver towards the follower, preferably in a direction parallel to the rotating axis of the shaft. The advantages of the follower-side biasing member can also be achieved by such a driver-side biasing member. These embodiments can be combined, i.e. the free-wheel clutch comprises a follower-side biasing member and a driver-side biasing member.

In one embodiment at least one part of the follower, e.g. a pin, can move radially with respect to the rotating axis of the driving member. A biasing element tends to move the follower part towards the driving member rotating axis such that the driver engages the, or at least one, movable follower part. A rotation of the driving member with respect to the shaft causes the movable follower part to be moved away from the driving member rotating axis against the biasing force of the biasing element.

In one embodiment the shaft for driving the driving member and thereby at least one part of the bale forming device can directly be connected with the output shaft of a propelled vehicle, e.g. a tractor, or with a motor of the baler. In a further embodiment the bale forming apparatus comprises a main input shaft which can be connected with the vehicle output shaft. The vehicle output shaft rotates the baler input shaft. The shaft for the bale forming device is driven by the baler input shaft, e.g. via a gearbox assembly. An overload clutch can be provided in the shaft or the main input shaft.

Preferably the bale forming apparatus comprises a feeding device, an input shaft, and a feeding-side output shaft. The feeding device can feed received loose material towards and into the provided bale forming chamber. The feeding-side output shaft is at least temporarily in drive connection with the feeding device. The shaft which is temporarily in drive connection with the rotatable driving member and is secured by the free-wheel clutch serves as a forming-side output shaft. The input shaft can rotate the feeding-side output shaft as well as the forming-side output shaft. Preferably the input shaft can be connected with the PTO shaft of a pulling vehicle.

In one embodiment the rotating axis of the forming-side output shaft coincides with the rotating axis of the rotatable driving member. It is also possible that these rotating axes are parallel to each other or are angular to each other. The free-wheel clutch can comprise a tapering driver and/or a tapering follower which is adapted to the angle between the two rotating axes.

In one embodiment the bale forming apparatus comprises an overload clutch which can disconnect the baler shaft for the bale forming device or a main input shaft of the baler from the vehicle output shaft or from an output shaft of a motor mounted on board of the bale forming apparatus. This overload clutch can be positioned in the shaft for the bale forming device or preferably in the baler input shaft. Preferably the free-wheel clutch temporarily disconnects the driving member from the shaft if the overload clutch is triggered.

In one implementation the overload clutch disengages the output shaft when the load, e.g. the torque, which is applied onto the shaft for the bale forming device or onto the baler input shaft reaches a load threshold wherein this load threshold is given by the construction of the overload clutch. It is also possible that a control unit of the bale forming apparatus can process signals received from at least one torque sensor and can generate a control input which disengages the overload clutch.

In one embodiment the bale forming chamber is drum-shaped and the bale-forming apparatus forms round-cylindrical bales. The bale forming device comprises several driven pressing rollers. At least one pressing roller serves as the, or one rotatable part of the bale forming device. In one implementation the bale forming device further comprises at least one tensioned pressing belt which partially surrounds the bale forming chamber. At least one driving roller drives the, or every pressing belt. The, or at least one, driving roller serves as the, or one rotatable part of the bale forming device. The shaft which is secured by the free-wheel clutch rotates via the driving member at least one pressing roller and/or at least one belt moving roller. The, or one rotatable part of the bale forming device can also be a further roller which is in contact with the rotated bale.

In an alternative embodiment the bale forming chamber has the shape of a channel and the bale forming apparatus forms cuboid bales in this channel. The bale forming device comprises at least one oscillating pressing piston. The shaft secured by the free-wheel clutch causes the piston to oscillate, e.g., via a plunger, and via the driving member.

These and other aspects of the invention and of the preferred embodiment will be even more apparent from the detailed embodiment as described below and will be elucidated in detail there.

DETAILED DESCRIPTION

In the embodiment the invention is used on board of a conventional or a continuous round baler. This round baler operates as follows:

A propelled vehicle pulls the round baler over an agricultural field.

A pick-up unit of the baler picks up loose crop material from the ground.

A conveying rotor conveys the picked-up crop material through a feeding channel towards a drum-shaped bale forming chamber.

Optionally a cutting assembly engages from below or from above into the feeding channel, cooperates with the conveying rotor, and cuts conveyed crop material into small pieces.

The conveyed and optionally cut crop material is injected through a crop material inlet into the bale forming chamber.

The circumferential surface of the bale forming chamber is surrounded by at least two driven pressing rollers and at least one pressing belt. In one implementation several parallel pressing belts surround the chamber's circumferential surface. The, or every, pressing belt is endless and elastic.

The invention can also be used on board of a round baler with a sequence of driven pressing rollers (not shown) surrounding the bale forming chamber.

An increasing round-cylindrical bale is formed under pressure from the injected crop material in the bale forming chamber and is rotated by the pressing rollers and pressing belts. The, or every, pressing belt applies pressure onto the crop material in the bale forming chamber. The bale forming chamber is surrounded by a casing comprising a pivotal discharge gate which is closed while the bale is formed.

A value indicative of the actual bale diameter is measured, e.g. the pivoting angle of a belt tensioning device or the pressure which the crop material in the pressing chamber apples onto the discharge gate. As soon as the actual diameter has reached a given diameter threshold, the circumferential surface of the bale is wrapped into several layers of wrapping material while the bale is still held together by the bale forming device. For doing so, a web of wrapping material is taken from a reservoir and conveyed towards the bale's circumferential surface.

In one embodiment the circumferential surface is wrapped in the bale forming chamber itself. The web is injected into the bale forming chamber. As long as the surface is wrapped, no further crop material is injected into the bale forming chamber. In a further embodiment the bale is transferred from the bale forming chamber into a wrapping chamber and further crop material is injected into the bale forming chamber.

After the required number of wrapping material layers are placed around the bale's circumferential surface, the web of wrapping material is severed. The discharge gate is opened. The formed and partially wrapped bale is ejected out of the bale forming chamber or out of the wrapping chamber.

Optionally the entire bale surface is wrapped outside of the casing into plastic sheet. For doing so, the bale is transferred onto a wrapping table. At least one plastic film is guided around the bale on the wrapping table.

The partially or entirely wrapped bale is deposited on the ground.

Optionally a tilting unit (quarter turn) tilts the wrapped round-cylindrical bale onto a front face such that it does not roll downwards even on a descending ground.

Figure 1:
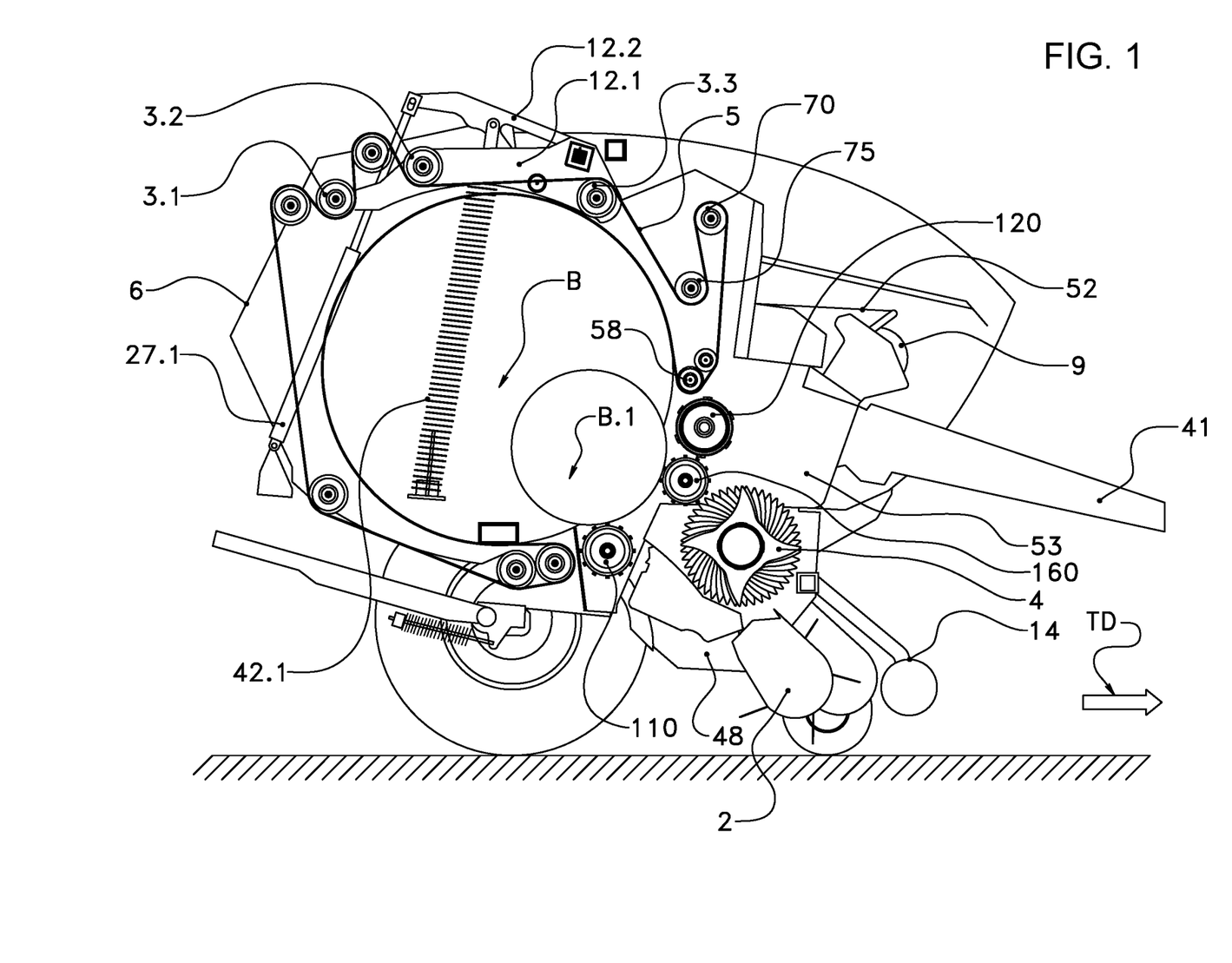
FIG. 1 shows schematically a round baler according to the invention in a vertical plane extending in a vertical center plane of the baler.

FIG. 1 shows schematically a round baler on board of which the invention is used. FIG. 1 shows a cross section through a vertical plane parallel to the travelling direction TD and extending in the middle of the round baler. This round baler is moved over ground by a pulling vehicle (not shown) in the travelling direction TD (in FIG. 1 from left to right).

FIG. 1 shows several parts of the round baler, in particular the following ones:
- a pick-up unit 2 with a driven pick-up drum carrying several pick-up tines wherein the drum is rotatably held by a pick-up frame,
- a downholder unit 14 positioned angularly above the pick-up unit 2 and comprising a downholder roller,
- a driven conveying rotor 4 with several rigid conveying tines which engage from above into the feeding channel,
- a cutting assembly 48 with several triangular knives which engage from below into the feeding channel,
- a casing for the bale forming chamber with a stationary front housing 53 and a pivotal tailgate 6,
- two pressing rollers 110 and 160 which are driven by the sprocket wheels (chain wheels) G10 and G60 (cf. FIG. 3),
- at least one endless elastic pressing belt 5,
- several idle deflecting rollers for the or every pressing belt 5, among them the movable guiding rollers 3.1, 3.2, 3.3 and the belt driving rollers 70 and 75 which are driven by means of sprocket wheels (chain wheels) G70 and G75 (cf. FIG. 3),
- a pivotal tensioning device with an inner tensioning device part 12.1 and an outer tensioning device part 12.2,
- two lateral and vertically oriented pulling springs 42.1, 42.2 which bias the tensioning device 12.1, 12.2 towards the crop material inlet,
- two hydraulic piston-cylinder units 27.1, 27.2 which are connected with the outer tensioning device part 12.2,
- an unrolling station carrying an active supply reel 9 with wrapping material in the form of a net,
- a web 52 of wrapping material which is pulled from the supply reel 9, and
- a driven web feeding roller 120.

The driven pressing rollers 110 and 160 delimit from two sides the crop material inlet which guides into the drum-shaped bale forming chamber.

The three movable deflecting rollers 3.1, 3.2, 3.3 are rotatably mounted at the inner tensioning device part 12.1. The outer tensioning device part 12.2 carries the tailgate 6. The two tensioning device parts 12.1, 12.2 are rigidly connected with each other.

FIG. 1 shows simultaneously a small bale B.1 adjacent to the crop material inlet and a bale B which has reached the required final diameter. A bale in the bale forming chamber reaches first the intermediate size B.1 and later the final size B.

The driven web feeding roller 120 conveys the web 52 into the bale forming chamber. The wrapping material inlet is positioned between the web feeding roller 120 and that belt segment which is guided around the adjacent deflecting roller 58.

Figure 2:
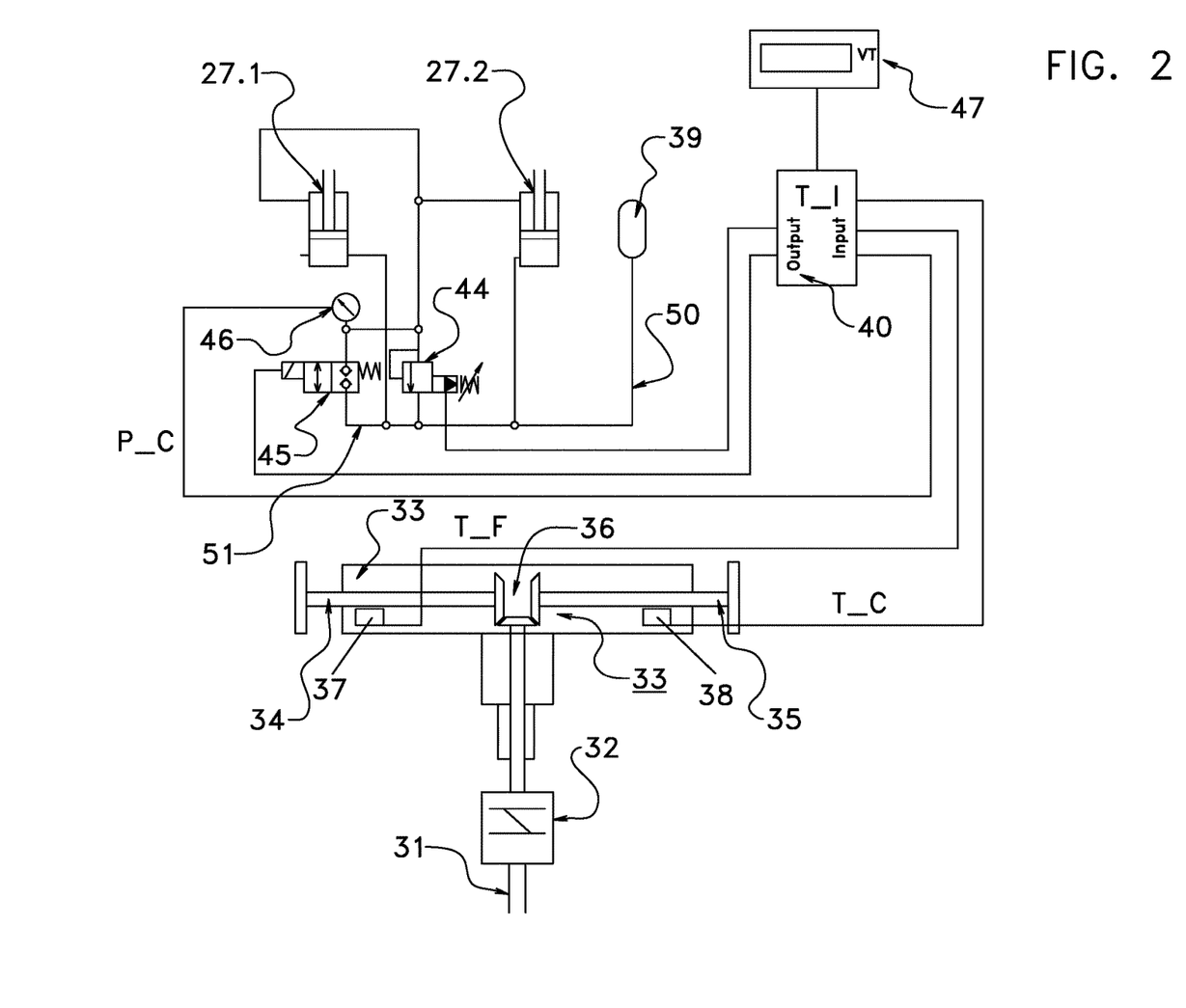
FIG. 2 shows a block diagram with several hydraulic actuators, the input shaft, and both output shafts.

FIG. 2 shows schematically a diagram for driving some parts of the bale forming device and for supplying some hydraulic actuators of the bale forming device with hydraulic fluid.

FIG. 2 shows the following parts of the hydraulic circuit of the bale forming device:
- the hydraulic piston-cylinder units 27.1 and 27.2 which are connected with the outer tensioning device part 12.2,
- a pressure releasing line 51 connecting both piston-cylinder units 27.1, 27.2,
- a control valve 44 which can open the pressure releasing line 51 and is controlled by the baler control unit 40,
- a high-speed relief valve 45,
- a hydraulic accumulator 39,
- a hydraulic line 50 guiding from the releasing line 51 to the accumulator 39, and
- a pressure transmitter 46 which measures the hydraulic pressure P_C in the releasing line 51.

The operation of this hydraulic circuit is explained in US 20160235007 A1.

The following parts for mechanically rotating parts of the bale forming device are shown in FIG. 2:
- a main input shaft 31 of the baler which can be connected with the PTO shaft of a pulling tractor,
- an overload clutch 32 in the main input shaft 31 which can interrupt the main input shaft 31 in the case of a high torque,
- a feeding-side output shaft 34,
- a forming-side output shaft 35 serving as the shaft in the sense of the claims,
- a bevel gear 36 which connects the input shaft 31 with both output shafts 34 and 35,
- a feeding-side torque sensor 37 which measures the torque T_F at the feeding-side output shaft 34, and
- a forming-side torque sensor 38 which measures the torque T_C at the forming-side output shaft 35.

The following further parts are shown in FIG. 2:
- a baler control unit (job controller) 40 and
- a user terminal 47 with a virtual terminal VT which can display alerts to the operator and which is mounted in the driver cab of the pulling tractor.

The bale control unit 40 is connected via a data connection (not shown) according to the ISOBUS Standard with the tractor control unit. A data bus connects the tractor control unit with the user terminal 47.

The feeding-side output shaft 34 drives those parts of the feeding device which are mechanically driven, in particular the pick-up drum of the pick-up unit 2 and the conveying rotor 4 and in one implementation an actuator for pivoting the cutting assembly 48. The forming-side output shaft 35 drives those parts of the bale forming device which are mechanically driven, in particular the pressing rollers 110 and 160, the web feeding roller 120, and the belt driving rollers 70 and 75.

In the embodiment the torque T_I applied onto the input shaft 31 is automatically calculated by using signals T_C, T_F from both torque sensors 37 and 38. The baler control unit 40 activates the overload clutch 32 and thereby disengages the input shaft 31 if the derived torque T_I is above a given torque threshold. It is also possible that the torque threshold of the overload clutch 32 is given by construction and that no torque is measured.

Figure 3:
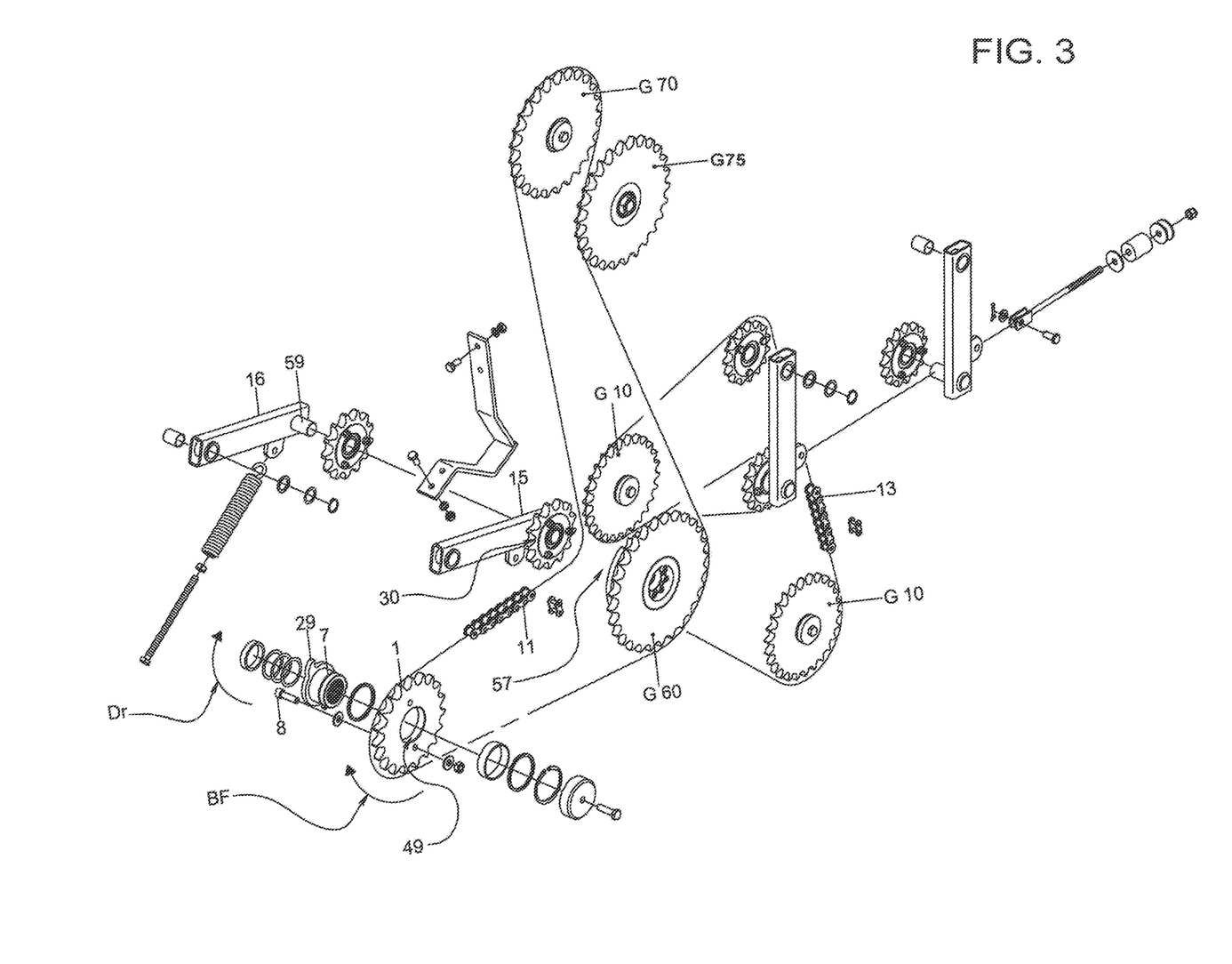
FIG. 3 shows some parts of the bale forming device and a first embodiment of the free-wheel clutch.

FIG. 3 shows a first possible embodiment of the free-wheel clutch and some parts of the bale forming device. As mentioned above, the bale forming device comprises several driven rollers 120, 160 in the form of pressing rollers and several rollers 70, 75 for driving the or every pressing belt 5. The chain wheels G10, G60, G70, and G75 rotate the rollers 110, 160, 70 and 75, resp.

The forming-side output shaft 35 is rotated in the driving direction Dr (in FIG. 3 clockwise). A chain wheel 1 serves as the rotatable driving member of the first embodiment and is rotated by the forming-side output shaft 35 in the bale forming direction BF. The rotation of the chain wheel 1 causes the chain 11 to be moved. The chain 11 rotates the chain wheels G60, G70 and G75 in the bale forming direction BF (in FIG. 3 the clockwise direction). An idle chain wheel 30 on the lever arm 15 is biased downwards against the chain 11 and tensions the chain 11. A chain wheel 57 on the shaft 59 for the chain wheel G60 drives the chain 13 which in turn rotates the chain wheel G10 for the pressing roller 110.

The chain wheel 1 is rotated in the bale forming rotating direction BF (in FIG. 3 the clockwise direction) by the forming-side output shaft 35 (not shown in FIG. 3). The rotating axis RA of the chain wheel 1 is identical with that of the output shaft 35, that is the chain wheel 1 is rotated by the forming side output shaft 35 in the bale forming direction BF about the rotating axis RA when the output shaft rotates about the rotating axis RA in the driving direction Dr (both clockwise in FIG. 3).

The free-wheel clutch of the first embodiment comprises a driver and a follower. The driver comprises a hub 7 with a toothed inner surface 28 which corresponds with a toothed segment (not shown) of the outer surface of the forming-side output shaft 35. The hub 7 cannot rotate with respect to the output shaft 35 but is shifted axially onto the output shaft 35 when manufacturing the bale forming apparatus. A free end 54 (not shown in FIG. 3) of the output shaft 35 protrudes through the toothed inner surface of the hub 7. The chain wheel 1 is positioned on this free shaft end 54. The free shaft end 54 has a smooth outer surface. The circular aperture in the chain wheel 1 also has a smooth surface 49, cf. FIG. 7. When the follower has no contact with the driver, the chain wheel 1 can rotate with respect to the shaft 35.

According to the first embodiment of the free-wheel clutch several protruding driving elements 29 are rigidly mounted on the outer surface of the hub 7. Every protruding element 29 comprises a straight front face extending in a plane perpendicular to the rotating axis of the output shaft 35 and an angular rear face. The terms "front face" and "rear face" refer to the clockwise rotating direction Dr of the output shaft 35.

Two pins 8 serve as following elements of the follower and extend parallel to the rotating axis RA of the chain wheel 1. A distance and therefore a lever arm occur between a pin 8 and the rotating axis RA.

In one implementation the pins 8 are rigidly mounted at the chain wheel 1 with a distance to the rotating axis of the chain wheel 1. In a further implementation the pins 8 can move axially with respect to the chain wheel 1. A follower-side biasing element (not shown) tends to move every pin 8 towards the rotating axis RA until the pin 8 contacts a stop element.

When the output shaft 35 is rotated in the driving direction Dr (in FIG. 3 clockwise), the respective straight front face of a protruding element 29 engages a pin 8 mounted on the chain wheel 1. The driver 7, 29 rotates the pins 8 and thereby the chain wheel 1. The chain wheel 30 on the lever arm 15 tensions the chain 11.

When the output shaft 35 is decelerated or is no longer rotated, the driver 7, 29 stops its rotation. Due to their inertia the rollers of the bale forming device and thereby the chain wheels G10, G60, G70, and G75 continue their rotation in the clockwise direction and move the chain 11. The chain 13 is also further rotated. The chain 11 rotates the chain wheel 1 and thereby the pins 8 in the bale forming rotating direction BF, i.e. in FIG. 3 in a clockwise direction. The rotated pins 8 glide over or move along the outer surface of the hub 7 of the driver and hit the angular rear edges of the protruding elements 29 mounted on the hub 7. The angular shape decelerates the rotational movement of the chain wheel 1. In one implementation the pins 8 are moved away from the rotating axis RA against the biasing force of the biasing element.

FIG. 4 to FIG. 7 shows a preferred second embodiment of the free-wheel clutch. The second embodiment of the free-wheel clutch is also used to secure the output shaft 35 when it drives the bale forming device with the chain wheels G10, G60, G70, G75 and further parts as shown in FIG. 3. The chain wheel 1 is mounted on the free end 54 of the output shaft 35. A hub 7 rotates together with the shaft 35.

Figure 4:
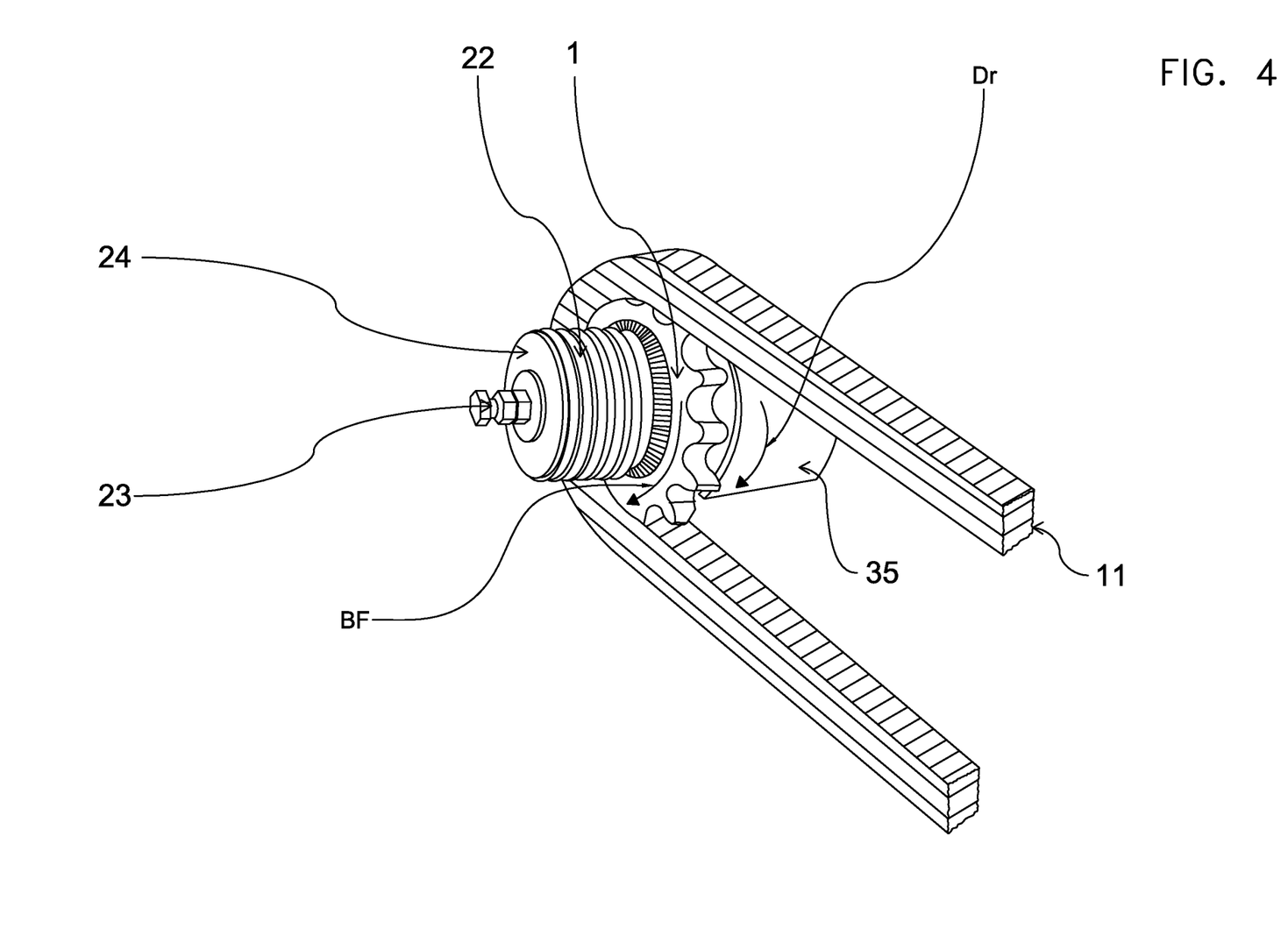
FIG. 4 shows the parts of the bale forming device in which a second embodiment of the free-wheel clutch is used.
Figure 5:
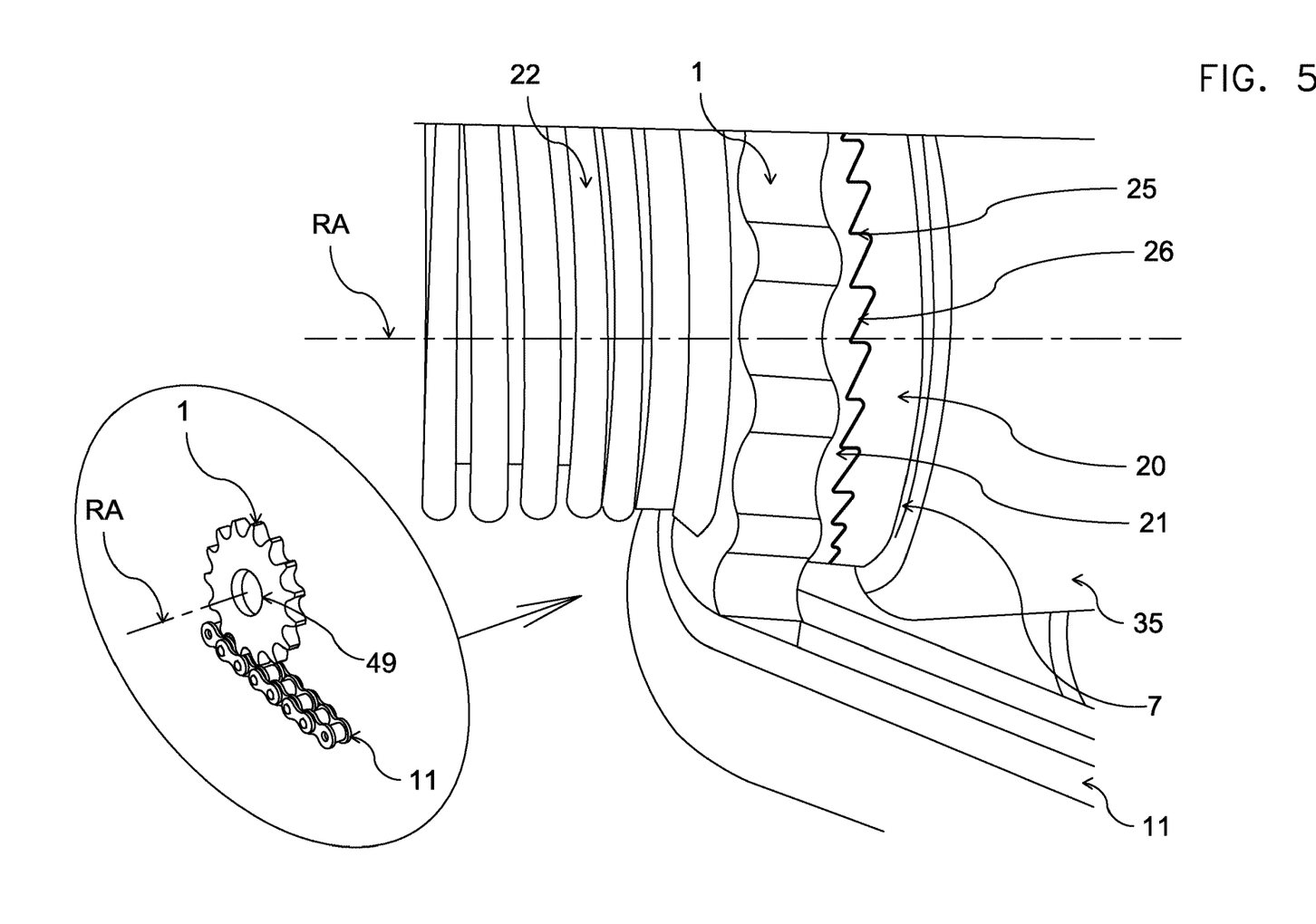
FIG. 5 shows the second embodiment of FIG. 4 in a detailed view.
Figure 6:
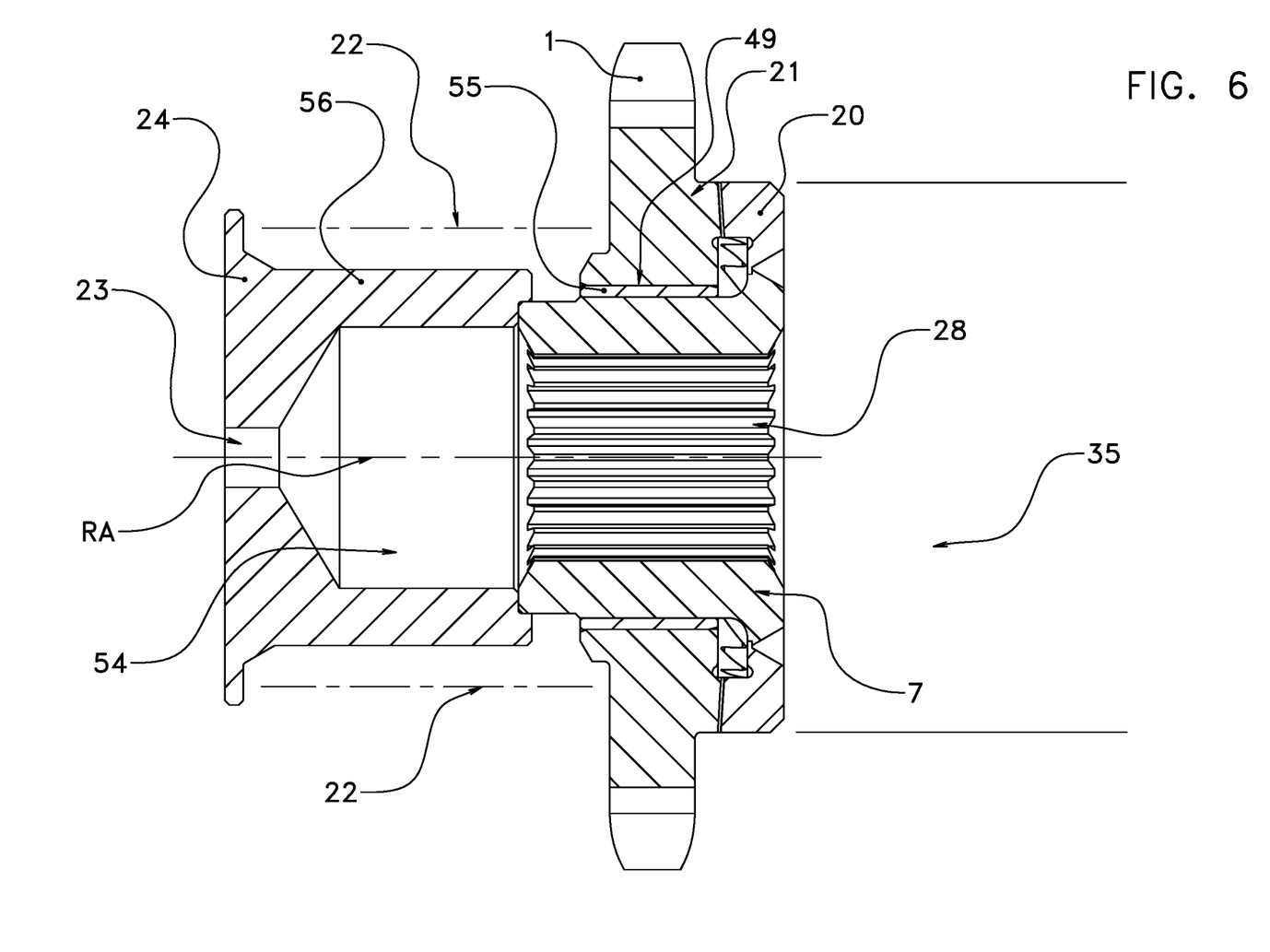
FIG. 6 shows schematically in a cross-sectional view the second embodiment.

As in the first embodiment the forming-side output shaft 35 and thereby the hub 7 is rotated in the driving direction Dr about the rotating axis RA and rotates the chain wheel 1 in the bale-forming rotating direction BF, that is the chain wheel 1 is rotated by the forming side output shaft 35 in the bale forming direction BF about the rotating axis RA when the output shaft rotates about the rotating axis RA in the driving direction Dr (both clockwise in FIG. 4). The rotated chain wheel 1 moves the chain 11 which in turn rotates several chain wheels of the bale forming device, cf. FIG. 3. The output shaft 35 is rotated clockwise and rotates the chain wheel 1 clockwise, cf. FIG. 4 and FIG. 5. The chain wheel 1 is mounted on the hub 7. The smooth inner surface of the chain wheel 1 surrounds the corresponding smooth outer surface of the hub 7. FIG. 6 shows the contact surface 55 between the chain wheel 1 and the hub 7. The free end 54 of the output shaft 35 protrudes through the hub 7, cf. FIG. 6. In FIG. 4 and FIG. 5 the lower segment of the chain 11 is moved away from the observer.

The free-wheel clutch of the second embodiment comprises
 a driver comprising the hub 7 and a driver-side crown gear 20 (in FIG. 5 and FIG. 6 on the right-hand side) and
 a follower in the form of a follower-side crown gear 21 (in FIG. 5 and FIG. 6 shown on the left-hand side).

Every crown gear 20, 21 comprises a toroid with an annular sequence of teeth each having a triangular cross section. In the embodiment both toroids have the same diameter. Each tooth has a front face 25 extending in a plane perpendicular to the rotating axis RA and an angular rear face 26.

The driver-side crown gear 20 is rigidly mounted at the hub 7 on the forming-side output shaft 35. It is possible to manufacture the hub 7 and the driver-side crown gear 27 separately, e.g. by milling both parts 7, 20 separately, and later to mount the crown gear 20 at the hub 7, e.g. by welding the crown gear 20 at the hub 7.

In the embodiment the output shaft 35 and thereby the driver-side crown gear 20 can only rotate around the shaft center axis RA but cannot be moved radially or axially with respect to the baler frame. As in the first embodiment, the hub 7 can only move axially with respect to the output shaft 35 but not radially.

Figure 7:
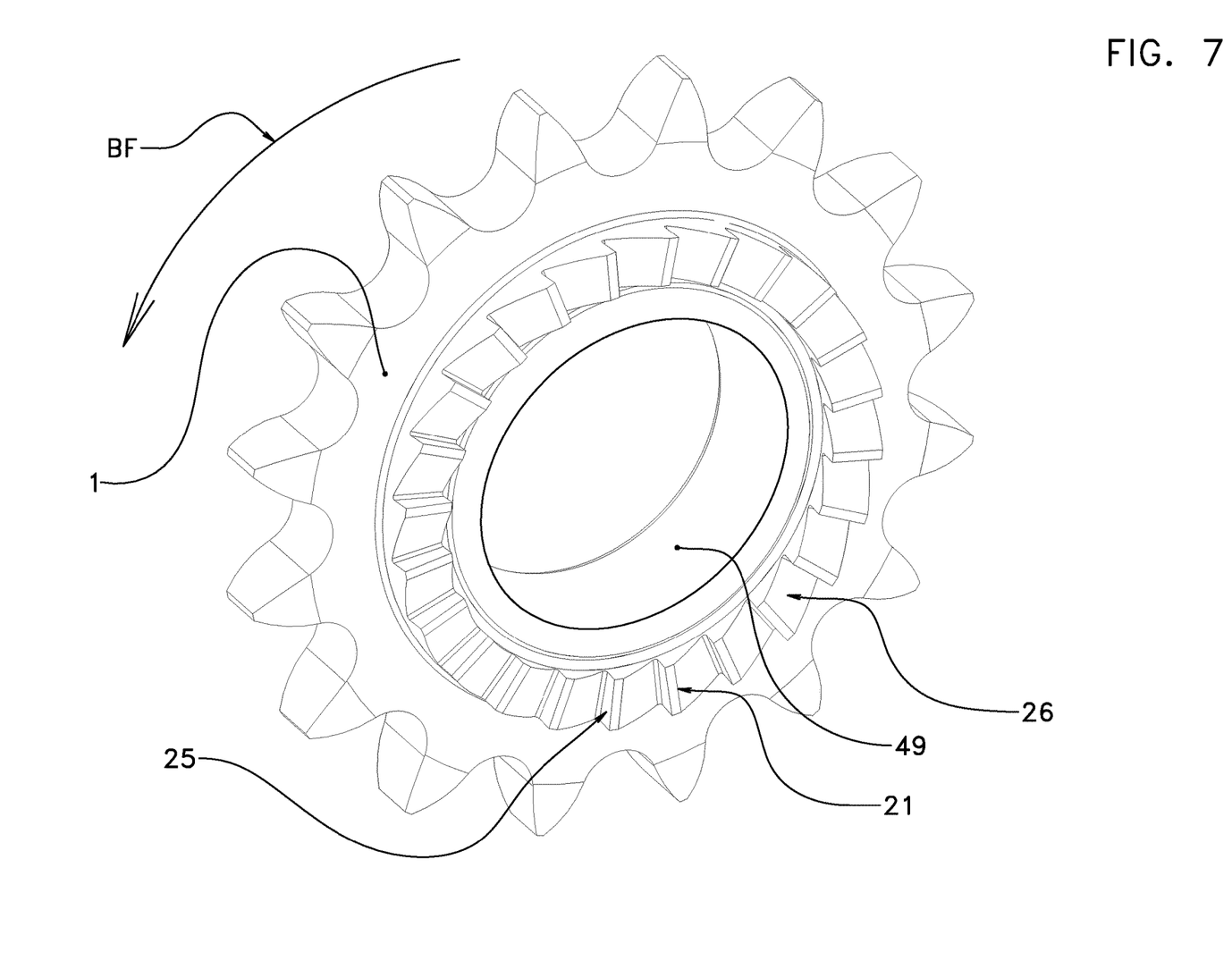
FIG. 7 shows the chain wheel and the follower-side crown gear of the second embodiment.

The follower-side crown gear 21 is rigidly mounted on one side of the chain wheel 1 and points towards the driver-side crown gear 20. It is possible to manufacture the chain wheel 1 and the follower-side crown gear 21 from one part, e.g. by milling this part.

As long as the follower-side crown gear 21 does not engage the driver-side crown gear 20, the chain wheel 1 can freely rotate with respect to the shaft 35. The chain wheel 1 and thereby the follower-side crown gear 21 can slightly move in an axial direction with respect to the output shaft 35, i.e. in a direction parallel to the common rotating axis RA of the chain wheel 1 and the output shaft 35 such that the engagement between the crown gears 20 and 21 is interrupted. The flexible chain 11 remains on the chain wheel 1 when the chain wheel 1 is axially moved away from the output shaft 35.

The driver-side crown gear 20 limits the possible movement of the chain wheel 1 towards the output shaft 35 (in FIG. 4 and FIG. 5 a movement to the right). A follower-side biasing member in the form of a helical pressing spring 22 extends between the free side of the chain wheel 1 (in FIG. 4 and FIG. 5 the left side of the chain wheel 1) and a disc 24 belonging to an end piece 56. The disc 24 extends in a plane perpendicular to the rotating axis RA, cf. FIG. 6. The end piece 56 with the disc 24 is mounted on the free end 54 of the output shaft 35 by means of a screw 23 and surrounds the free end 54. The spring 22 tends to expand and thereby to move the chain wheel 1 towards the output shaft 35 such that the teeth of the follower-side crown gear 21 stays in engagement with the corresponding teeth of the driver-side crown gear 20. Moving the chain wheel 1 away from the output shaft 35 tends to compress the spring 22 against the spring force. The end piece 56 with the disc 24 rotate together with the output shaft 35 and the hub 7. Preferably the end piece 56 does not rotate with respect to the shaft end piece 54 and cannot move axially or radially with respect to the shaft 35. The spring 22 extends between the disc 24 and the chain wheel 1 and is also rotated. The end piece 56 with the disc 24 and the screw 23 belong to the driver of the second embodiment.

As long as the output shaft 35 and thereby the screw 23 and the end piece 56 with the disc 24 and the hub 7 rotate, the spring 22 keeps the chain wheel 1 in a position in which the driver-side crown gear 20 engages the follower-side crown gear 21. The front faces 25 of the driver-side crown gear 20 touch the front faces 25 of the follower-side crown gear 21. No substantial relative movement between the crown gears 20, 21 occurs.

If the output shaft 35 and thereby the hub 7 decelerate or stop their rotation around the rotating axis RA, the inertia of the rotated parts of the bale forming device causes the chain wheel 1 to continue its rotation in the bale forming rotating direction BF. The angular rear faces 26 of the follower-side crown gear 21 move in a tangential direction over the corresponding angular rear faces 26 of the decelerated or stopped driver-side crown gear 20 on the hub 7. Thanks to the angular rear faces 26 and the relative rotation the follower-side crown gear 21 and thereby the chain wheel 1 is shifted away from the driver-side crown gear 20. This linear movement is performed in the direction of the rotating axis RA. The disc 24 supports the spring 22 from the outer (in FIG. 4 to FIG. 6, the left) side. Thanks to the spring 22 and the disc 24 the linear movement is executed against the biasing force applied by the spring 22. The moved chain wheel 1 compresses the spring 22.

As soon as the chain wheel 1 also has stopped its rotation, the spring 22 expands again and shifts the chain wheel 1 and the follower-side crown gear 21 towards the hub 7. Thanks to the spring 22 and the angular rear faces 26 the chain wheel 1 is slightly rotated until the two crown gears 20 and 21 fully engage each other again. As soon as the output shaft 35 continues its rotation, the engaging crown gears 20 and 21 transfer this rotation onto the biased chain wheel 1. The rotated chain wheel 1 again moves the chain 11.

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

LIST OF REFERENCE SIGNS

| | |
|---|---|
| 1 | chain wheel, drives the chain 11, serves as the driving member, connected with the follower-side crown gear 21 |
| 2 | pick-up unit, comprises a rotated pick-up drum with tines |
| 3.1, 3.2, 3.3 | moveable guiding rollers, mounted at the inner tensioning arm 12.1 |
| 4 | conveying rotor with rigid tines, engage from above into the feeding channel |
| 5 | pressing belt(s) |
| 6 | pivotal tailgate, pivotally connected with the front housing |
| 7 | hub, mounted on the forming-side output shaft 35, connected with the driver-side crown gear 20 |
| 8 | pins, mounted on the chain wheel 1, belong to the follower |
| 9 | supply reel with wrapping material being kept in an unrolling station |
| 11 | chain for driving chain wheels G10, G60, G70, G77, driven by the chain wheel 1 |
| 12.1 | inner tensioning device part, carries three moveable guiding rollers |
| 12.2 | outer tensioning device part, carries the pivotal tailgate 6 |
| 13 | chain for driving further chain wheels, driven by the chain wheel 57 |
| 14 | downholder unit above the pick-up unit 2 |
| 15 | pivotal lever arm on which the idle chain wheel 30 is mounted |
| 16 | further pivotal lever arm |
| 20 | driver-side crown gear, rigidly mounted on the hub 7 |
| 21 | follower-side crown gear, rigidly mounted on the chain wheel 1 |
| 22 | pressing spring, tends to move the chain wheel 1 towards the forming-side output shaft 35 |
| 23 | screw for connecting the end piece 56 with the free end 54 of the output shaft 35, belongs to the driver |
| 24 | disc which belongs to the rotated end piece 56 on the output shaft 35 which support the spring 22, belongs to the driver |
| 25 | front edges of the crown gears 20, 21, are perpendicular to the rotating axis RA |
| 26 | angular rear edges of the crown gears 20, 21 |
| 27.1, 27.2 | hydraulic piston-cylinder units of the bale forming device, tend to close the tailgate 6 |
| 28 | toothed inner surface of the hub 7, corresponds with and surrounds a toothed segment on the outer surface of the forming-side output shaft 35 |

-continued

| | LIST OF REFERENCE SIGNS |
|---|---|
| 29 | protruding driving elements on the hub 7 |
| 30 | idle chain wheel on the pivotal lever arm 15, tensions the chain 11 |
| 31 | input shaft of the baler, drives the feeding device 2, 4 via the feeding-side output shaft 34 and the bale forming device 5, 70, 75, 110, 160, G10, G60, G70, G75 via the forming-side output shaft 35 |
| 32 | overload clutch, protects and interrupts the input shaft 31 in the case of an overload situation |
| 33 | transmission assembly, comprises the bevel gear 36 |
| 34 | feeding-side output shaft |
| 35 | forming-side output shaft |
| 36 | bevel gear in the transmission assembly 33 |
| 37 | feeding-side torque sensor, measures the torque $T_F$ at the feeding-side output shaft 34 |
| 38 | forming-side torque sensor, measures the torque $T_C$ at the forming-side output shaft 35 |
| 39 | hydraulic accumulator |
| 40 | control unit (job controller) of the baler, receives the torque signals $T_C$ and $T_F$, generates control inputs for the valve 44 |
| 41 | towing unit of the baler, can be connected with a tractor hitch |
| 42.1, 42.2 | pulling springs, biasing the tensioning device 12.1, 12.2 |
| 44 | control valve, keeps the hydraulic pressure below a given pressure threshold, can open the pressure releasing line 51 |
| 45 | high-speed relief valve, decreases the hydraulic pressure, can open the pressure releasing line 51 |
| 46 | pressure transmitter, measures the pressure $P_C$ |
| 47 | display unit with the virtual terminal VT, displays alerts to the operator |
| 48 | triangular knives, engage from below into the feeding channel |
| 49 | smooth inner surface of the chain wheel 1 |
| 50 | hydraulic line to the accumulator 39 |
| 51 | pressure releasing line, can be opened by the control valve 44 and the relief valve 45 |
| 52 | web of wrapping material, pulled from the supply reel 9 in the unrolling station |
| 53 | front housing |
| 54 | free end of the output shaft 35, protrudes through the hub 7, carries the hub 7 and the end piece 56 |
| 55 | contact surface between the chain wheel 1 and the hub 7 |
| 56 | end piece with the disc 24, mounted on the free end 54 of the output shaft 35, mounted by means of the screw 23, belongs to the driver |
| 57 | driven chain wheel, drives the chain 30 |
| 58 | belt deflecting roller above the wrapping material inlet |
| 59 | shaft for the chain wheel G60 |
| 70, 75 | driven rollers which rotate the or every pressing belt 5, driven by the chain wheels G70, G75 |
| 110, 160 | rotated pressing rollers, driven by the chain wheels G10, G60 |
| 120 | driven web feeding roller, conveys the web 52 |
| B | completed bale in the bale forming chamber |
| B.1 | bale with an intermediate diameter already created during the bale forming phase |
| BF | bale forming rotating direction of the chain wheel 1 |
| DR | driving direction of the forming-side output shaft 35 |
| G70, G75 | chain wheels for rotating the rollers 70, 75 for driving the pressing belts 5 |
| G10, G60 | chain wheels for rotating the pressing rollers 110, 160 |
| RA | common rotating axis of the chain wheel 1 and the forming-side output shaft 35 |
| $T_C$ | forming-side torque value, measured by the forming-side torque sensor 38 |
| $T_F$ | feeding-side torque value, measured by the feeding-side torque sensor 37 |
| TD | traveling direction |
| VT | virtual terminal of the display unit 47 |

The invention claimed is:

1. A bale forming apparatus comprising:
an input shaft
a bale forming device providing a bale forming chamber;
a feeding device, arranged to feed received loose material towards and to inject the loose material into the bale forming chamber to form a bale from the injected loose material;
a feeding-side output shaft which is at least temporarily in drive connection with the feeding device; and
a forming-side output shaft which is at least temporarily in drive connection with a chain wheel, wherein the chain wheel is in chain drive connection with at least one rotatable part of the bale forming device,
wherein the input shaft is arranged to rotate the feeding-side output shaft and the forming-side output shaft being in drive connection with the chain wheel, a free-wheel clutch is provided between the forming-side output shaft and the chain wheel, wherein the free-wheel clutch transfers rotation of the forming-side output shaft in a driving direction onto the chain wheel to cause the chain wheel to rotate in a bale forming rotating direction about a shaft rotating axis, and wherein the free-wheel clutch enables a further rotation of the chain wheel in the bale forming rotating direction with respect to the forming-side output shaft.

2. The bale forming apparatus according to claim 1, whereby the free-wheel clutch comprises:
   a driver which is in drive connection with the forming-side output shaft; and
   a follower which is in drive connection with the chain wheel, wherein a rotation of the forming-side output shaft in the driving direction causes the driver to be rotated in the driving direction, and wherein a rotation of the driver in the driving direction causes the follower to be rotated in the bale forming rotating direction, thereby causing the chain wheel to rotate in the bale forming rotating direction, and wherein the follower can rotate with respect to the driver in the bale forming rotating direction.

3. The bale forming apparatus according to claim 2, whereby the driver is rigidly mounted on a free end of the shaft and the follower is rigidly mounted on the chain wheel.

4. The bale forming apparatus according to claim 2, whereby the free-wheel clutch comprises a follower-side biasing member which tends to bias the follower towards the driver in a direction parallel to the rotating axis of the chain wheel, wherein a rotation of the chain wheel with respect to the forming-side output shaft in the bale forming rotating direction causes the follower to be moved away from the driver against a biasing force applied by the follower-side biasing member.

5. The bale forming apparatus according to claim 4, whereby the free-wheel clutch further comprises a supporting member, wherein the follower-side biasing member is positioned between the supporting member and the chain wheel.

6. The bale forming apparatus according to claim 5, whereby a rotation of the forming-side output shaft in the driving direction causes the supporting member to rotate in the bale forming rotating direction.

7. The bale forming apparatus according to claim 2, whereby the free-wheel clutch comprises a driver-side biasing member which tends to bias the driver towards the follower in a direction parallel to a rotating axis of the forming-side output shaft, wherein a rotation of the chain wheel in the bale forming rotating direction causes the driver to be moved away from the follower against a biasing force applied by the driver-side biasing member.

8. The bale forming apparatus according to claim 2, whereby the driver comprises at least one driving element which is mounted on a free end of the forming-side output shaft with a distance to the rotating axis of the forming-side output shaft and the follower comprises at least one following element mounted on the chain wheel with a distance to the rotating axis of the chain wheel, wherein a rotation of the forming-side output shaft causes the or every driving element to rotate around the shaft rotating axis, to engage the or at least one following element, and to make the engaged following element and thereby the chain wheel to rotate around the rotating axis of the chain wheel.

9. The bale forming apparatus according to claim 8, whereby a rotation of the chain wheel in the bale forming rotating direction with respect to the forming-side output shaft causes at least one of the driving element or the following element to be moved in a direction perpendicular to that rotating axis around which the moved element rotates.

10. The bale forming apparatus according to claim 8, whereby the free-wheel clutch comprises a biasing element which tends to bias the following element in a direction perpendicular to the rotating axis of the chain wheel towards the driving element, wherein a rotation of the chain wheel with respect to the forming-side output shaft in the bale forming rotating direction causes the following element to be moved away from the driving element against a biasing force applied by the biasing element onto the following element.

11. The bale forming apparatus according to claim 9, whereby the free-wheel clutch comprises a biasing element which tends to bias the following element in a direction perpendicular to the rotating axis of the chain wheel towards the driving element, wherein a rotation of the chain wheel with respect to the forming-side output shaft in the bale forming rotating direction causes the following element to be moved away from the driving element against a biasing force applied by the biasing element onto the following element.

12. The bale forming apparatus according to claim 1, whereby the free-wheel clutch comprises:
   at least one annular or toroidal driver-side serrated member; and
   at least one annular or toroidal follower-side serrated member, wherein the or every driver-side serrated member is in drive connection with the forming-side output shaft, wherein the or every follower-side serrated member is in drive connection with the chain wheel, wherein the or every follower-side serrated member points towards the or one assigned driver-side serrated member, wherein the or every driver-side serrated member is arranged to temporarily engage the or one assigned follower-side serrated member, wherein a rotation of the or one driver-side serrated member in the driving direction causes the or one assigned engaged follower-side serrated member to rotate in the bale forming rotating direction, and wherein a rotation of the chain wheel with respect to the forming-side output shaft in the bale forming rotating direction causes the follower-side serrated member to rotate with respect to the driver-side serrated member.

13. The bale forming apparatus according to claim 12, whereby at least one of the follower-side serrated member or the driver-side serrated member is implemented as a crown gear or spur gear.

14. The bale forming apparatus according to claim 12, whereby the free-wheel clutch comprises a follower-side biasing member which tends to bias the follower-side serrated member towards the driver-side serrated member.

15. The bale forming apparatus according to claim 13, whereby the free-wheel clutch comprises a follower-side biasing member which tends to bias the follower-side serrated member towards the driver-side serrated member.

16. The bale forming apparatus according to claim 15, whereby the follower-side serrated member is rigidly mounted on the chain wheel and the follower-side biasing member tends to bias the chain wheel together with the follower-side serrated member towards the driver-side serrated member.

17. The bale forming apparatus according to claim 12, whereby the free-wheel clutch comprises a driver-side biasing member which tends to bias the driver-side serrated member towards the follower-side serrated member.

18. A method for forming a bale from loose material by using a bale forming apparatus comprising a bale forming device providing a bale forming chamber, a chain wheel which is in drive connection with at least one rotatable part of the bale forming device and a shaft, wherein the method comprises the steps that:

the bale forming apparatus receives loose material and injects the received loose material into the provided bale forming chamber;

the shaft is rotated in a driving direction about a shaft rotating axis and rotates at least temporarily the chain wheel in a bale forming direction about the shaft rotating axis;

the chain wheel drives the bale forming device or at least one rotatable part of the bale forming device; and the bale forming device forms in the provided bale forming chamber a bale from injected loose material, whereby the bale forming device further comprises a free-wheel clutch which is provided between the shaft and the chain wheel, wherein the method comprises the steps that:

the free-wheel clutch transfers rotation of the shaft in a driving direction onto the chain wheel such that the chain wheel is rotated in the bale forming rotating direction; and at least one time the chain wheel is rotated in the bale forming rotating direction with respect to the shaft, wherein the free-wheel clutch enables this rotation of the chain wheel with respect to the shaft.

19. The bale forming method according to claim 18, whereby the free-wheel clutch further comprises:

a driver which is in drive connection with a free end of the shaft; and a follower which is in drive connection with the chain wheel, wherein the step that the free-wheel clutch transfers a rotation of the shaft onto the chain wheel comprises the steps that:

a rotation of the shaft in the driving direction causes the driver to be rotated in the driving direction;

the rotation of the driver in the driving direction causes the follower to be rotated in the bale forming rotating direction;

the rotation of the follower causes the chain wheel to rotate in the bale forming rotating direction, and wherein the step that the chain wheel is rotated with respect to the shaft comprises the step that:

the follower rotates with respect to the driver in the bale forming rotating direction.

20. The bale forming method according to claim 18, whereby the free-wheel clutch comprises:

at least one annular or toroidal driver-side serrated member; at least one annular or toroidal follower-side serrated member which points towards the or one driver-side serrated member; and a follower-side biasing member which tends to bias the follower-side serrated member towards the driver-side serrated member, wherein the step that the free-wheel clutch transfers a rotation of the shaft onto the chain wheel comprises the steps that:

the biased follower-side serrated member engages the driver-side serrated member;

the rotation of the shaft causes the driver-side serrated member to rotate; the rotation of the driver-side serrated member causes the engaged follower-side serrated member to rotate; and the rotation of the follower-side serrated member causes the driving member to rotate, and wherein the steps that the chain wheel is rotated with respect to the shaft and the free-wheel clutch enables this rotation comprise the step that the follower-side serrated member is moved away from the driver-side serrated member against the biasing force of the follower-side biasing member such that the follower-side serrated member can rotate with respect to the driver-side serrated member.

21. The bale forming method according to claim 19, whereby the free-wheel clutch comprises:

at least one annular or toroidal driver-side serrated member; at least one annular or toroidal follower-side serrated member which points towards the or one driver-side serrated member; and a follower-side biasing member which tends to bias the follower-side serrated member towards the driver-side serrated member, wherein the step that the free-wheel clutch transfers a rotation of the shaft onto the chain wheel comprises the steps that:

the biased follower-side serrated member engages the driver-side serrated member;

the rotation of the shaft causes the driver-side serrated member to rotate; the rotation of the driver-side serrated member causes the engaged follower-side serrated member to rotate; and the rotation of the follower-side serrated member causes the driving member to rotate, and wherein the steps that the chain wheel is rotated with respect to the shaft, and the free-wheel clutch enables this rotation comprise the step that:

the follower-side serrated member is moved away from the driver-side serrated member against the biasing force of the follower-side biasing member.

\* \* \* \* \*